United States Patent [19]

Bollinger

[11] Patent Number: 4,622,717
[45] Date of Patent: Nov. 18, 1986

[54] PORTIONING MACHINE TO FILL MOLDS WITH PLASTIC FOOD MATERIAL AND USE OF SAME

[75] Inventor: Rudolf Bollinger, Brunnen, Switzerland

[73] Assignee: Hollymatic AG. Ingenbohl, Switzerland

[21] Appl. No.: 773,856

[22] Filed: Sep. 9, 1985

Related U.S. Application Data

[63] Continuation of Ser. No. 448,076, Dec. 9, 1982, abandoned.

[30] Foreign Application Priority Data

Dec. 10, 1981 [CH] Switzerland ............ 7907/81

[51] Int. Cl.$^4$ ................................................ A22C 7/00
[52] U.S. Cl. ............................................... 17/32; 17/37
[58] Field of Search .................. 17/32, 37; 100/177; 425/376 R, 376 B; 418/39, 126, 264

[56] References Cited

U.S. PATENT DOCUMENTS

| | | | |
|---|---|---|---|
| 1,320,892 | 11/1919 | Munn | 418/264 |
| 2,963,735 | 12/1960 | Gaudlitz | 17/37 |
| 3,001,482 | 9/1961 | Osborn | 418/264 |
| 3,050,771 | 8/1962 | Mylchreest | 17/41 |
| 3,151,806 | 10/1964 | Whitfield | 418/159 |
| 3,162,894 | 12/1964 | Hutchins et al. | 17/37 |
| 3,292,207 | 12/1966 | Herrick | 17/32 |
| 3,334,546 | 8/1967 | Vuolle-Apiala | 418/159 |
| 3,549,280 | 12/1970 | Linneken | 418/21 |
| 3,718,410 | 2/1973 | Berger et al. | 418/159 |
| 3,723,031 | 3/1973 | Brown | 418/159 |
| 3,742,556 | 7/1973 | Beasley | 17/37 |
| 3,871,798 | 3/1975 | Berlich | 418/39 |
| 4,113,415 | 9/1978 | Holly | 17/32 |
| 4,118,169 | 10/1978 | Haluska | 17/32 |
| 4,147,485 | 4/1979 | Zimmerman | 17/32 |
| 4,182,003 | 1/1980 | Lamartino et al. | 17/32 |
| 4,212,609 | 7/1980 | Fay | 425/100 |

FOREIGN PATENT DOCUMENTS

| | | | |
|---|---|---|---|
| 333308 | 2/1921 | Fed. Rep. of Germany | 418/39 |
| 2919417 | 11/1980 | Fed. Rep. of Germany | 418/264 |
| 1086713 | 4/1954 | France | 17/37 |
| 1182935 | 9/1957 | France | . |
| 1422912 | 10/1964 | France | . |
| 1547556 | 9/1967 | France | . |
| 2455436 | 1/1981 | France | 17/37 |
| 500382 | 1/1971 | Switzerland | . |
| 506252 | 6/1971 | Switzerland | . |
| 506332 | 6/1971 | Switzerland | . |
| 1056529 | 1/1967 | United Kingdom | . |
| 200454 | 11/1967 | U.S.S.R. | 17/37 |

Primary Examiner—Nicholas P. Godici
Assistant Examiner—Kurt Rowan
Attorney, Agent, or Firm—Bernard, Rothwell & Brown

[57] ABSTRACT

An eccentrically positioned rotary piston (11) in an almost round casing (10) is driven by a pressure controlled hydraulic motor (27) with radial slots (12), guided rams (13).

The radial position of the rams (13) is set with a control valve (15).

A removable insert (16) in the housing (10) serves to alter the pre-compression of the material. This ensures that gas escapes from ground meat intended for molding patties and that the material is pressed at an even pressure into the mold plate opening (23). No changes are necessary when altering the mold plate size because the driving pressure is limited and this determines the filling amount.

16 Claims, 4 Drawing Figures

PORTIONING MACHINE TO FILL MOLDS WITH PLASTIC FOOD MATERIAL AND USE OF SAME

This is a continuation of application Ser. No. 448,076, filed Dec. 9, 1982, now abandoned.

This invention refers to a portioning machine to fill molds with plastic food material according to the main meaning of the independant Patent claim 1, as well as use of the same according to the main reason of the independant Patent claim 8.

BACKGROUND TO THE INVENTION

Similar machines for the production of ground meat or fish patties etc. are known. According to CH-A No. 506 252 an appliance to form products is equipped with a hopper to hold a supply of the plastic food material, an adjustable mold near the hopper which has a mold opening and which is connected by a channel and a feeding unit in the form of a ram in this channel. The ram is stopped as it travels towards the mold in order to maintain a certain pressure on the product until the mold is moved away from the feed opening. Afterwards the ram can be moved back again to begin the next filling procedure.

Due to changes in the surroundings, especially the temperature of the product, as well as its consistency, the pressure in the product can vary quite considerably so that in one instance too much product is pressed into the mold and the patty is blown after molding, or in other instance the mold is only partially filled.

According to CH-A No. 506 332, a system was built into the same machine, which drives the feeding movement of the ram depending on the pressure of the material in the mold plate opening. Consequently, the desired consistency of the product to be molded can be regulated so that the patties being produced are all of uniform density even when the physical features of the product and/or the feeding speed should alter.

Both these units and other known machines have a piston moving to and fro and a so-called ram to press the ground meat through a fill slot in a mold. It has been proved that gas present in the meat, namely air, can cause a change in the tissue fibres of the meat while being molded, because meat is more permeable than fat so that more fat can be found on one side of the patties. Moreover, the ground meat is pressed against one wall and must flow in a different direction to that of the power vector. This can cause the meat to be torn and it then tastes different than originally intended.

SUMMARY OF THE INVENTION

It is one object of the invention to create a portioning machine which on the one hand is controlled by the pressure in the material but with which the disadvantages of a machine working by a ram are eliminated. In addition, the filling pressure should be adjustable according to the type of material, whether pasty, or in pieces.

Inventively this has been achieved according to the points mentioned in the independant Patent claim 1. Special use is mentioned under independant Patent claim 8.

According to CH-A No. 500 382 it is known that a pump is used for feeding flowable products namely, cement. Such a pump has a horizontal rotary piston with adjustable rams whereby the rams are driven by fixed cam plates in a radial direction.

The cam plate drives the ram in such a way that the amount conveyed is less than 180° and the ram is retracted when it reaches the opening of the filling tube. This ensures a continual feeding of material without causing a congestion at the opening which could damage the pump. With difficult products, such as ground meat and the like, the conveying capacity of the pump must be adjustable, according to the varying pressure in the product. There are no suggestions on this in any mentioned publications which can be regarded as representative.

An executed example of the invention is illustrated in the following detailed description, with reference to the drawing.

THE FIGURES

FIG. 1—A sectional view of a portioning machine for material that is to be molded under high pressure.

FIG. 2—The same sectional view as FIG. 1, but for material that is to be molded under low pressure.

FIG. 3—Side elevation of the portioning machine according to FIG. 2, partially shown in a section and;

FIG. 4—A diagram of the hydraulic control system.

DETAILED DESCRIPTION OF THE INVENTION

Figure 3:
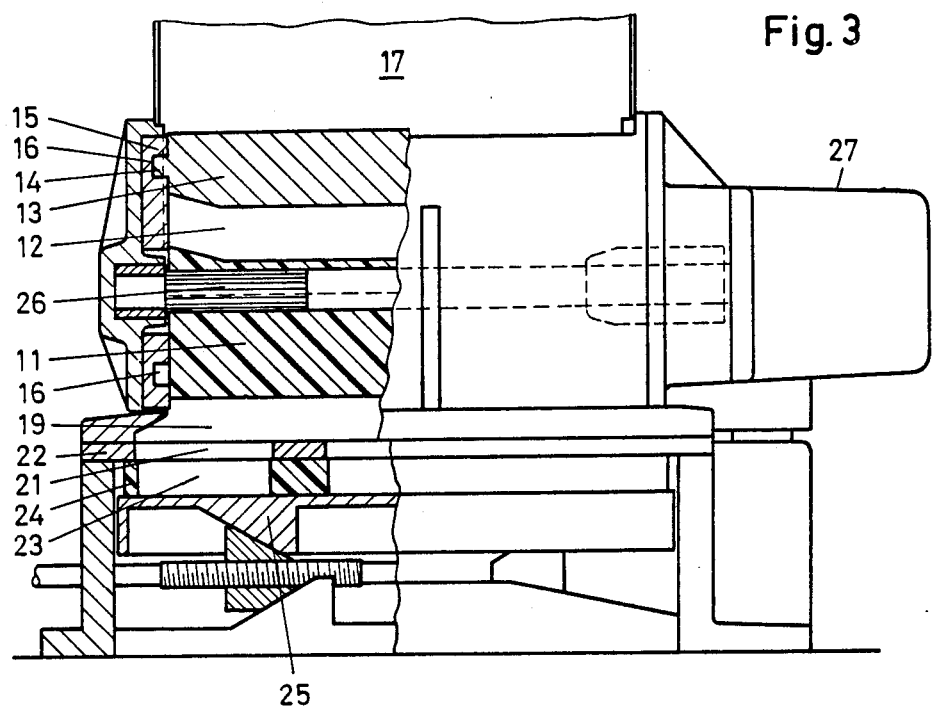

The compression system (1) includes a circular, cylindrical pump housing (10) with an eccentrically arranged rotary piston (11). For example, the rotary piston (11) has six radial slots (12) along the whole axial length and radially movable rams (13) are fixed into these slots (12). As shown in FIG. 3, each ram (13) has a guide cam (14) with which it grips a guide slot (16) in a control disc (15). Above the rotary piston (11), the side of the housing (10) is partially open. Above this is the hopper (17). In this hopper (17) there is a feed ram (18) pushing the material in the hopper towards the rotary piston (11).

Below the rotary piston (11) the housing (10) has an opening (19) which, together with the compression chamber (20), constitutes the feed channel. The comression chamber (20) opens above a fill slot (21) in a fill plate (22) towards the mold opening (23) in the mold plate (24) which moves back and forth, which lies on a pressure plate (25). Above the rotary shaft (26), the rotary piston (11) is connected to a hydraulic drive motor (27).

Figure 1:
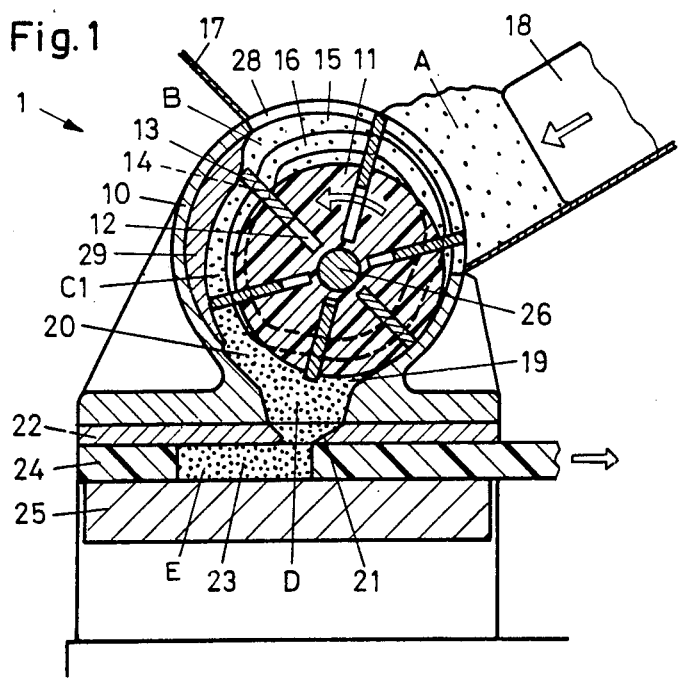

In FIG. 1, an insert (29) has been installed on the inner side of the housing (10) between the in-feed opening (28) and the out-feed opening (19), so that the space between the housing wall and the rotary piston (11) is reduced. Accordingly, the guide slot (16) of the control disc (15) has to be different in both cases as shown in FIGS. 1 and 2, so that the outer radial sides of the rams (13) run smoothly on the surface of the insert (29) or on the inner side of the housing in order to feed the material between the rams.

The material at point A in the hopper (17) has been filled in loosely and is slightly pre-compressed by the feed ram (18) and in this pre-compressed state is then pushed into the compression system, at point B.

Figure 2:
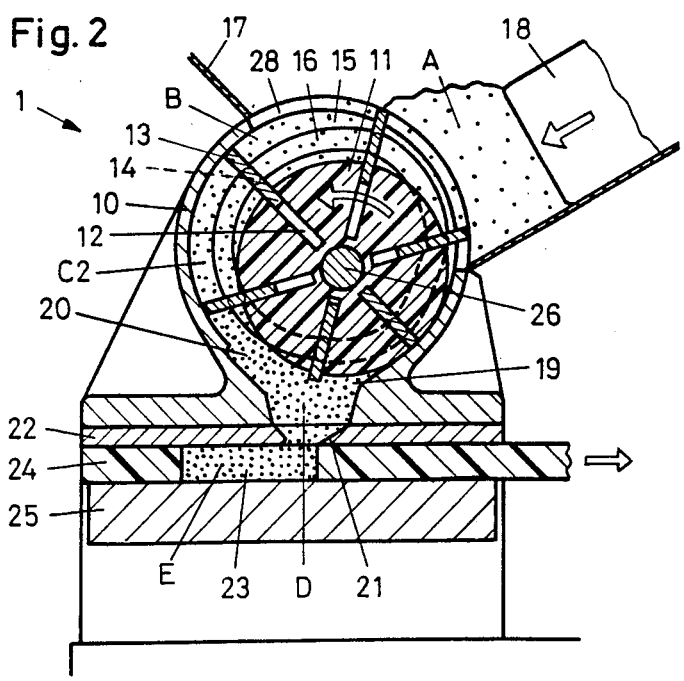

The material is pre-compressed at C 1 in FIG. 1 or C 2 in FIG. 2, so that the air can escape. It can be clearly seen on the drawing that the material in FIG. 1 is more firmly compressed than that in FIG. 2.

In this pre-compressed state, the product passes on into the compression chamber (20) where it is pressed according to the torque of the drive motor (27). The compressed product at point D then flows through the filling slot (21) into the mold plate (23) with practically the same pressure at E as at D.

The result is that the material is no longer pressed into the mold at increasing pressure, but with a constantly set hydraulic pressure and even when flowing into the mold plate opening (23), the pressure is still the same. The gas has enough time to escape from the material so that practically gas-free material is filled in and the consistency of the meat does not alter. The material is not torn at all as used to happen previously with the ram and the filling slot in the opposite direction to that of the pressure vector.

By the choice of thickness of the insert (29) on the one hand, and the hydraulic pressure, which effects the drive motor (27), the material can be pressed at different degrees so that with the same portioning machine different foodstuffs can be processed, such as ground meat for hamburgers with insert (29), or noodles, meat balls, sliced meat or gulash without insert (29).

Figure 4:
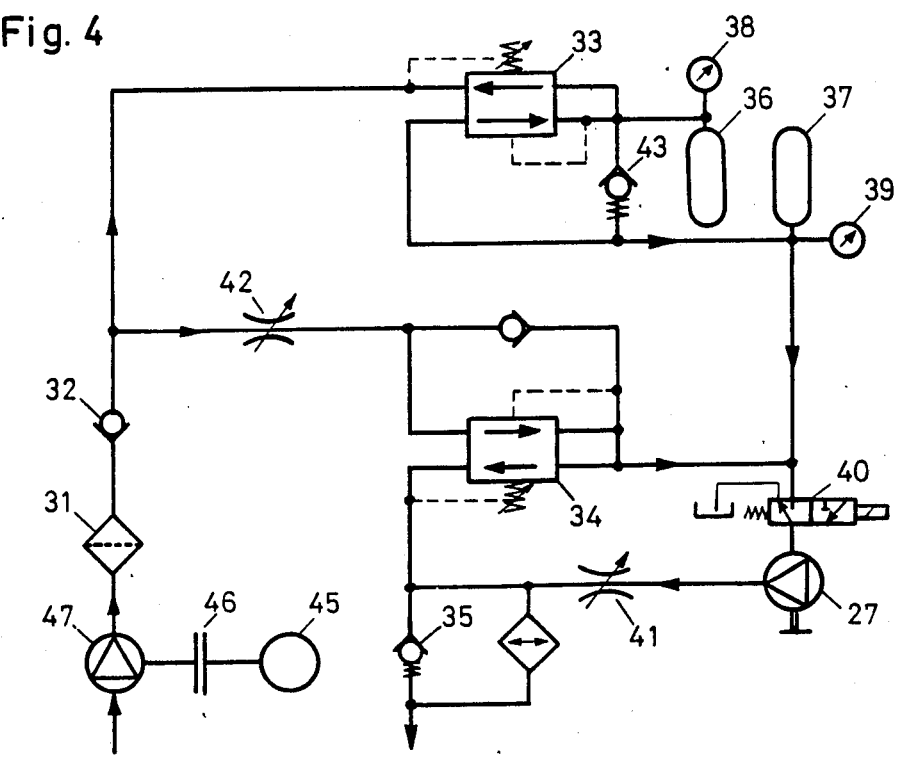

An example of a pressure controlled hydraulic control system for two different pressures in the pressure chamber (19) is shown in FIG. 4.

Hydraulic pressure solvent e.g. oil is compressed with an electric motor (45), a clutch (46) and an axial piston adjustable pump (47). This compressed oil is fed via a pressure filter (31) and a reflux valve (32) to a pressure reducing valve (33), that can be set for example from 3.5 to 70 bar. A low pressure accumulator (36) is fed with low pressure and a high pressure accumulator (37) is fed with high pressure via a reflux valve (43). Pressure is controlled with manometers (38,39).

The drive motor is controlled by a throttle (42) and another pressure reducing valve (34). The safety switch (40) prevents oil from running into the drive motor in the event of a power failure. The output from the drive motor (45) is via a pressure reducing valve (41) and a relief pressure valve (35) connected parallel to an oil pressure filter with the oil tank (not shown).

Of course with other types of control systems it would also be possible to achieve a certain pressure e.g. a mechanical system with constantly revolving motors, such as a friction clutch, but one would have to reckon here with high loss of warmth.

Practically any desired volume of material can be processed with this machine and with a given mold plate opening material can be portioned and filled in constantly at the same set pressure.

It is within the scope and spirit of the invention to make such variations and modifications and substitution of equivalents as might be apparent to any person of ordinary skill in the art.

I claim:

1. Portioning machine to fill mold with plastic food material such as ground meat and the like with a hopper (17) to hold a material supply, a feeding channel (19,20) to feed the material to a mold filling place (23) and with a compression system (1) between the hopper and the feeding channel the characteristic of which is that the compression system is equipped with an almost circular cylindrical housing (10) having an inner wall, eccentrically arranged rotary piston (11) with several radially adjustable flat rams (13) and a fixed control disc to set the radial position of the rams (13) depending on the angle of the rotary piston (11) and that the feeding channel (19,20) is also a compression chamber (20) and also has a control system (27) to drive the rotary piston (11) which either starts or stops the piston (11) from rotating depending on the pressure of the material in the compression chamber so that the material being filled into a mold is at a substantially constant pressure during the filling of the mold; the portioning machine including at least one insert (29) to adjust the distance between the ram (13) and the inner wall of the housing (10) for the gradual adjustment of pressure on the material.

2. The machine in accordance with claim 1, in which the control disc (15) has a guide slot (16) for the guide pin (14) of the rams (13).

3. The machine in accordance with claim 2, in which the control disc (15) is inter-changeable.

4. The machine in accordance with claim 1, in which each insert (29) has its own control disc (15).

5. The machine in accordance with claim 1 is equipped with a hydraulic motor (27) to drive the rotary piston (11) and a hydraulic control system for adjusting the maximum torque of the rotary piston.

6. The machine in accordance with claim 5, in which the control part of the hydraulic control system is a pressure controlled valve (34).

7. Use of the machine in accordance with claim 1, for the manufacture of meat patties from ground meat.

8. The machine in accordance with claim 1 in which said hopper feeds material to said compression system through an in-feed opening in said housing, wherein said hopper is above asid in-feed opening and positioned so that material being fed from said hopper into said in-feed opening does not completely cover said in-feed opening thereby allowing gas to escape the material during compression through said in-feed opening.

9. A portioning machine to fill a mold with a plastic food material comprising:
   (a) a hopper to hold a material supply;
   (b) a material compression system to feed material to and fill a mold, the compression system being fed material by the hopper, the compression system including an almost circular cylindrical housing having an inner wall, an eccentrically arranged rotary piston with several radially adjustable flat rams, a fixed control disc to set the radial position of the rams depending on the angle of the rotary piston and a feeding channel through which material is fed to a mold, the feeding channel including a compression chamber for feeding material to a mold; and
   (c) a control system including means for driving the piston, and means for controlling the piston driving means to maintain material in the compression chamber at a substantially constant pressure so that material being filled into a mold from the compression chamber is at a substantially constant pressure during the filling of the mold; the portioning machine including at least one insert (29) to adjust the distance between the ram (13) and the inner wall of the housing (10) for the gradual adjustment of pressure on the material.

10. The machine in accordance with claim 9 in which the piston driving means is a hydraulic motor, and the means for controlling the piston driving means comprises a hydraulic control system for adjusting maximum torque of the rotary piston.

11. The machine in accordance with claim 10 in which the hydraulic control system is controlled by a pressure controlled valve.

12. The machine in accordance with claim 9 in which said hopper feeds material to said compression system through an in-feed opening in said housing, wherein said hopper is above said in-feed opening and positioned so that material being fed from said hopper into said in-feed opening does not completely cover said in-feed opening thereby allowing gas to escape the material during compression through said in-feed opening.

13. A portioning machine to fill a mold with a plastic food material comprising:
   (a) a hopper to hold a material supply;
   (b) a material compression system to feed material to and fill a mold, the compression system being fed material by the hopper, the compression system including an almost circular cylindrical housing having an inner wall, an eccentrically arranged rotary piston with several radially adjustable flat rams, a fixed control disc to set the radial position of the rams depending on the angle of the rotary piston and a feeding channel through which material is fed to a mold, the feeding channel including a compression chamber for feeding material to a mold; and
   (c) a control system including means for driving the piston, and means for controlling the piston driving means which either starts or stops the piston from rotating to maintain material in the compression chamber at a substantially constant pressure so that material being fed from the compression chamber to a mold is at a substantially constant pressure during the filling of the mold; the portioning machine including at least one insert (29) to adjust the distance between the ram (13) and the inner wall of the housing (10) for the gradual adjustment of pressure on the material.

14. The machine in accordance with claim 13 in which the piston driving means is a hydraulic motor, and the means for controlling the piston driving means comprises a hydraulic control system for adjusting maximum torque of the rotary piston.

15. The machine in accordance with claim 14 in which the hydraulic control system is controlled by a pressure controlled valve.

16. The machine in accordance with claim 13 in which said hopper feeds material to said compression system through an in-feed opening in said housing, wherein said hopper is above said in-feed opening and positioned so that material being fed from said hopper into said in-feed opening does not completely cover said in-feed opening thereby allowing gas to escape the material during compression through said in-feed opening.

* * * * *